Patented Aug. 31, 1954

2,688,035

UNITED STATES PATENT OFFICE

2,688,035

NEUTRALIZATION OF SULFONIC ACIDS AND SULFURIC ACID ESTERS WITH THE USE OF SOLID ALKALI CARBONATES

Eugen Jacob, Oberhausen-Holten, Helmut Kolling, Duisburg-Hamborn, Ewald Stiebling, Oberhausen-Sterkrade, Germany, and August Hagemann, deceased, late of Duisburg-Meiderich, Germany, by Elisabeth Charlotte Margarete Hagemann, administratrix, Duisburg-Meiderich, Germany, and Arnold Tofahrn, administrator, Duisburg-Meiderich, Germany, assignors to Ruhrchemie Aktiengesellschaft, Oberhausen-Holten, Germany, a corporation of Germany No Drawing. Application April 22, 1952,
Serial No. 283,766

Claims priority, application Germany
April 24, 1951

7 Claims. (Cl. 260—505)

This invention relates to the neutralization of sulfonic acids and sulfuric acid esters with the use of solid alkali carbonates.

In processes as, for example, in the production of alkyl aryl sulfonates for detergents, the neutralization of sulfonic acids or sulfuric acid esters is necessary. This neutralization is generally effected with the use of alkali hydroxides.

The neutralization of the sulfonic acids or sulfuric acid esters may be continuously effected with dry alkali carbonates. In this process the reactants may be intimately contacted in a fine dispersion, it being expedient to dilute the sulfonic acids or the sulfuric acid esters with small amounts of water. The intimate mixing between the acid and alkaline compounds may be obtained by atomizing the sulfonic acids or the sulfuric acid esters on one hand and using a finely ground, dry alkali carbonate on the other hand. The sprays of the atomized sulfonic acids or sulfuric acid esters and the finely ground dry alkali carbonate being directed toward each other in such a manner that a good contacting and interaction therebetween is obtained. The reaction may be effected, for example, with one or two spray nozzles located in a sufficiently large reaction chamber, such as a reaction tower. If the nozzles are located in the upper portion of the tower, the atomized neutralization product will collect at the bottom of the tower where it may be removed by means of any suitable device, such as a conveying device or by means of scrapers. The product is then homogenized, for example, with rollers, and then dried after, if desired, a suitable period of storage. Such a process for the continuous neutralization of sulfonic acids or sulfuric acid esters is described in U. S. patent application No. 211,194 filed February 15, 1951.

In the practical execution of this continuous neutralization process, however, certain disadvantages arise. The neutralization product produced may, due to irregularities in the dosing of the acid and/or alkali components, be still weakly acid. Such an acid reaction of the finished products is highly undesirable, as it results in moist end products and in difficulties in the subsequent milling of the finished product. It is highly desirable to obtain these neutralization products which are principally used for detergents in a completely dry non-hygroscopic form without any extensive evaporation of water.

One object of this invention is the continuous neutralization of sulfonic acids or sulfuric acid esters with dry alkali carbonates without the above-mentioned difficulties. This, and still further objects will become apparent from the following description:

It has now been found that the above-mentioned difficulties will be completely eliminated by effecting the neutralization with a quantity of alkali carbonate of about 1% to 10%, and preferably about 5% in excess of the quantity required for the neutralization. After the neutralization with this excess of alkali carbonate, the reaction product is subjected to a homogenization in any known manner, and after the homogenization the pH is adjusted to the desired value with an acid such as sulfuric acid, and prefereably diluted sulfonic acid. The finished product is subjected to a further homogenization and drying. If necessary or desired, the product may be stored for a period of time prior to this further homogenization and drying. The products produced in this manner have a considerably improved consistency and may be very easily discharged from the reaction vessel and process.

The excess quantity of solid alkali carbonate used in accordance with the invention may, in accordance with a preferred embodiment, be blown into the reaction vessel by means of one or more additional spray nozzles located near the bottom or in the lower part of the reaction tower. This embodiment has the advantage of finally coating the reaction product with a fine layer of alkali carbonate, which gives it a mealy and dry surface. The excess of alkali carbonates to be used in accordance with the invention may be introduced to the reaction vessel at any optional point. It may be admitted from above with the atomized alkali carbonate as well as from below or laterally through additional spray nozzles. A small excess of soda is expediently left in the reaction product in order to prevent the later formation of free acid which might produce a discoloration of the finished product. The finished end product is adjusted to a pH value of 7–10 and preferably of 7–7.5.

The superficially dry reaction product so obtained may be discharged from the reaction tower in many various ways. It may be conveyed to a roller or kneading machine by means of scrapers, or the bottom of the reaction tower may be so shaped that the neutralized products are withdrawn in a downward direction and may immediately be led over rollers. The discharge may also be effected in accordance with any other known or conventional expedient.

After homogenization, as, for example, by passage through a roller pair, the neutralization product will already become firm to a large extent, and may have its pH value adjusted to the desired amount by the addition of small amounts of sulfuric or aqueous sulfonic acids. Quantities of acid required are most suitably added to the reaction products in the form of a spray. It is generally expedient to work with a small excess quantity of alkali in order to avoid discoloration of the sulfonates in the subsequent drying process.

As already mentioned, the finished product is adjusted to a pH value of 7–10 and preferably of 7–7.5. For this purpose, sulfuric acid, sulfonic acid, or phosphoric acid may be used. Also hydrochloric acid is suitable unless a content of chlorides will be disturbing in the detergent to be produced. The concentration of the sulfuric acid may be from 10–98% and preferably from 20–40% $H_2SO_4$. Sulfonic acids having a water content of 5–20% may be used.

After the pH value has been adjusted as described above with the addition of acid, the reaction products must be homogenized once again. This may be effected with additional roller pairs, a conveyor worm or similar working devices. It is sometimes of advantage to store the products for about 15 to 60 minutes prior to the subsequent homogenization. This may be effected by the use of a very slow running conveyor belt arranged between two successive roller pairs. This conveyor belt will lead the mass to be processed from one roller pair to the next.

The product, after being treated in the manner described above, is removed from the final homogenization as from the roller surfaces in the form of thin ribbons or strings by means of suitable stripping devices and is dried by hot gases or infra-red rays or the like. The dried product is then crushed in any suitable manner, as, for example, by means of a toothed roll, and separated from oversized and undersized particles by means of sieving devices or the like. The undersized particles are expediently admixed with the product discharged from the reaction tower and will aid in the solidification of this product.

The process, in accordance with the invention, overcomes all the disadvantages previously encountered and allows the neutralization and drying of sulfonic acids and sulfuric acid esters continuously with simple means and with the means of cheap alkali carbonates instead of the conventionally used alkali hydroxides. As contrasted to the conventionally known processes, completely dry, non-hygroscopic products may be obtained without any extensive evaporation of water. The process, in accordance with the invention, may be carried out with alkyl aryl sulfonic acids which contain 1–2 aromatic rings and, in their side chains, 4–20 carbon atoms. Moreover, 1–2 H atoms of the aromatic rings may be substituted by hydroxyl groups. Besides alkyl aryl sulfonic acids, also sulfuric acid esters may be processed which are obtained from alcohols or olefins of any chain length. Sulfuric acid esters having 12–18 carbon atoms are expediently used in this case.

Carbonates or, as the case may be, also bicarbonates of sodium, potassium and ammonium are suited for the neutralization, the carbonates being used in commercial purity.

The process, in accordance with the invention, is carried out at normal atmospheric pressure. The sulfonic acids or sulfuric acid esters are treated at a temperature of 10–60° C. The air used for the atomization has a temperature of 10–50° C. and preferably of 10–20° C.

The following example is given by way of illustration and not limitation:

*Example*

20 kilos of sulfonic acid which was prepared by sulfonation from a monoalkyl benzene having an aliphatic side chain of 12 carbon atoms were preheated to 40° C., atomized in an acid-proof lined reaction tower of 4 meters in height and 2 meters in diameter by means of a spray nozzle located at the top of the tower. The atomization was effected by means of an air stream into which pulverized anhydrous sodium carbonate (98% $Na_2CO_3$) had been injected at a rate of 6 kilos per hour.

The sulfonic acid contained 81.9% of monoalkyl benzene sulfonic acid, 7.9% of sulfuric acid, and 10% of water. The atomized reaction product collected at the bottom of the tower and was continuously removed by means of a roller pair. The product had an excess of soda of 4.3% $Na_2CO_3$. After the passage through the discharging rollers, it was admixed with 3.5 kilos of dilute sulfuric acid (20% $H_2SO_4$), homogenized in subsequent rollers, lifted in the form of thin ribbons by means of strippers and dried with hot air. The dry product was crushed by means of a toothed roll and freed from oversized and undersized particles by means of sieving devices. The end product contained 83% of sodium sulfonate, 1% of sodium carbonate and 16% of other inorganic salts, chiefly in the form of sodium sulfate.

We claim:

1. In a process for the continuous neutralization of sulfonic acids with solid alkali carbonates by intimately contacting the reactants in a finely dispersed form, the improvement which comprises intimately contacting the finely divided dispersion of a sulfonic acid with a quantity of the dispersed, solid alkali carbonate of about 1% to 10% in excess of the quantity required for the neutralization of said sulfonic acid, homogenizing the reaction product, adding an acid to the reaction product in amount sufficient to substantially neutralize at least a portion of the excess alkali carbonate content, further homogenizing and drying the product.

2. Improvement according to claim 1, in which said product is stored for a period of time of about 15 to 60 minutes prior to said further homogenization.

3. Improvement according to claim 1, in which said intimate contacting is effecting with an amount of solid alkali carbonate of about 5% in excess of the amount required for the neutralization of said sulfonic acid.

4. Improvement according to claim 1, in which the acid added to said reaction product to substantially neutralize at least a portion of the excess alkali carbonate content is dilute sulfonic acid.

5. Improvement according to claim 4, in which said dilute sulfonic acid is added in the form of a spray.

6. Improvement according to claim 1, in which said contacting of said sulfonic acid and said alkali carbonate is effected with atomizing in a reaction chamber, said excess alkali carbonate being atomized from at least one spray nozzle located in the lower portion of the reaction chamber.

7. Improvement according to claim 1, which includes crushing the dried product, separating the undersized and oversized portions from the product, and returning the undersized portions for admixture with the neutralization product obtained from said contacting.

References Cited in the file of this patent

UNITED STATES PATENTS

| Number | Name | Date |
| --- | --- | --- |
| 2,214,254 | Mills et al. | Sept. 10, 1940 |
| 2,231,979 | Wolter | Feb. 18, 1941 |
| 2,321,020 | Dreger et al. | June 8, 1943 |
| 2,325,320 | Holuba | July 27, 1943 |